(12) United States Patent
Inomata

(10) Patent No.: US 10,409,365 B2
(45) Date of Patent: *Sep. 10, 2019

(54) METHOD OF PROVIDING A VIRTUAL SPACE IMAGE SUBJECTED TO BLURRING PROCESSING BASED ON DETECTED DISPLACEMENT, AND SYSTEM THEREFOR

(71) Applicant: COLOPL, Inc., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/678,046

(22) Filed: Aug. 15, 2017

(65) Prior Publication Data

US 2017/0364146 A1    Dec. 21, 2017

Related U.S. Application Data

(63) Continuation of application No. 15/422,426, filed on Feb. 1, 2017, now Pat. No. 9,766,697.

(30) Foreign Application Priority Data

Feb. 2, 2016  (JP) ................. 2016-017825

(51) Int. Cl.
*G06F 3/01* (2006.01)
*G06T 11/60* (2006.01)
(Continued)

(52) U.S. Cl.
CPC .......... *G06F 3/012* (2013.01); *G02B 27/017* (2013.01); *G06T 5/002* (2013.01); *G06T 11/60* (2013.01);
(Continued)

(58) Field of Classification Search
CPC ....... G06F 3/012; G06F 3/011; G02B 27/017; G06T 5/002; G06T 11/60; A63F 2300/6692; A63F 2300/8082
See application file for complete search history.

(56) References Cited

U.S. PATENT DOCUMENTS

| 9,766,697 | B2 * | 9/2017 | Inomata ................ G06T 5/002 |
| 2014/0361977 | A1 | 12/2014 | Stafford et al. |
| 2016/0282619 | A1 | 9/2016 | Oto et al. |

FOREIGN PATENT DOCUMENTS

| JP | 10-341387 A | 12/1998 |
| JP | 2007-116309 A | 5/2007 |

(Continued)

OTHER PUBLICATIONS

Office Action in JP Application No. 2016-017825, dated Aug. 3, 2016.
(Continued)

*Primary Examiner* — Maurice L. McDowell, Jr.
(74) *Attorney, Agent, or Firm* — Hauptman Ham, LLP

(57) ABSTRACT

A method including generating a virtual space image for displaying on a head mounted display (HMD). The method further includes acquiring a rotational direction and a rotational speed of the HMD. The method further includes subjecting the virtual space image to blurring processing based on the rotational direction and the rotational speed, the blurring processing being performed on end regions of the virtual space image on both sides of the virtual space image in a direction corresponding to the rotational direction, a size of the end regions corresponding to the rotational speed, and an intensity of blurring of the end regions corresponding to the rotational speed.

6 Claims, 9 Drawing Sheets

(51) Int. Cl.
  *G06T 5/00* (2006.01)
  *G02B 27/01* (2006.01)
(52) U.S. Cl.
  CPC ............... *A63F 2300/6692* (2013.01); *A63F 2300/8082* (2013.01); *G06F 3/011* (2013.01)

(56) References Cited

FOREIGN PATENT DOCUMENTS

WO  2014/197226 A1  12/2014
WO  2015/068656 A1  5/2015

OTHER PUBLICATIONS

Office Action in JP Application No. 2016-017825, dated Oct. 4, 2016.
Decision to Grant a Patent in JP Application No. 2016-017825, dated Jan. 10, 2017.

* cited by examiner

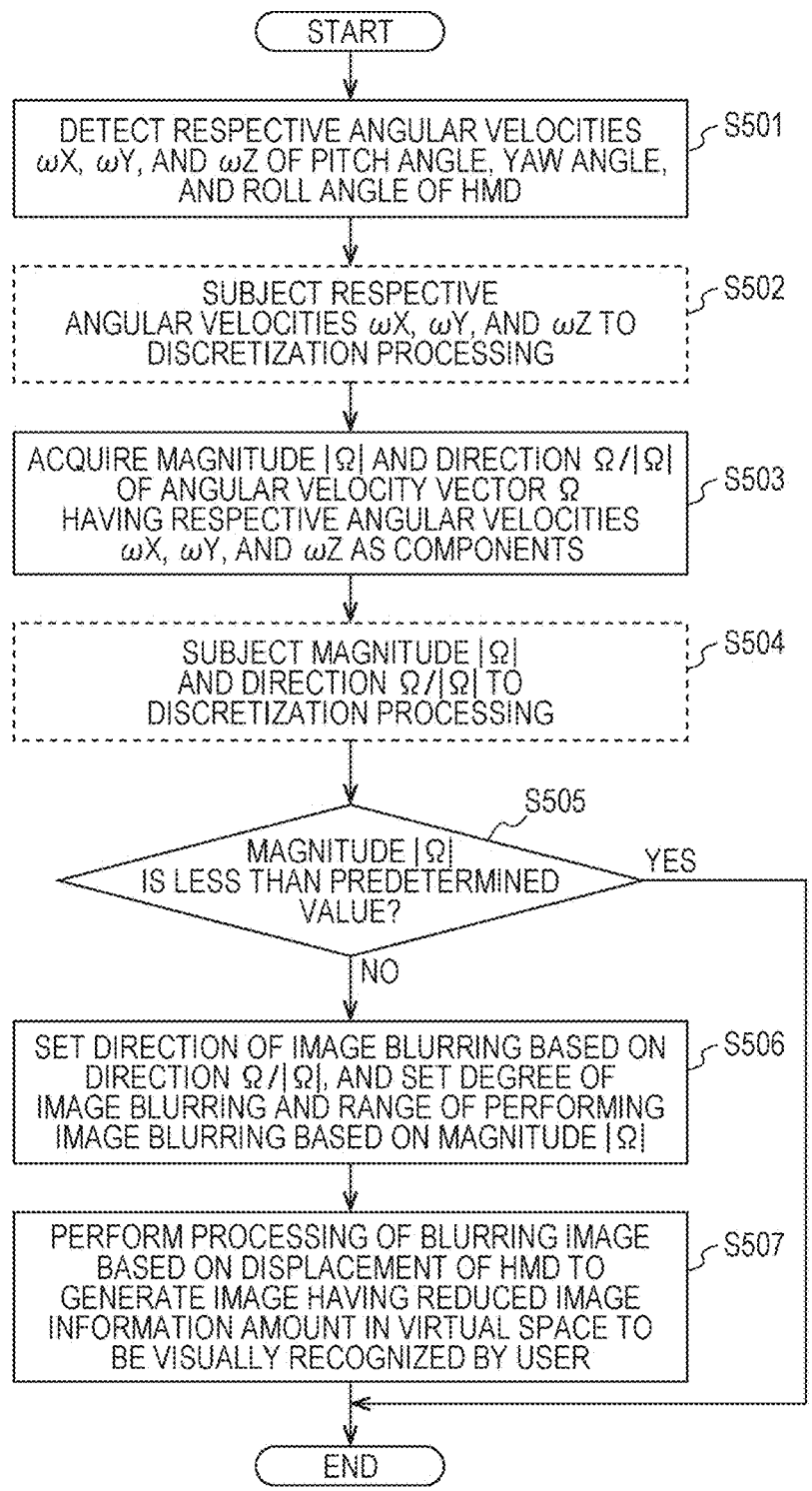

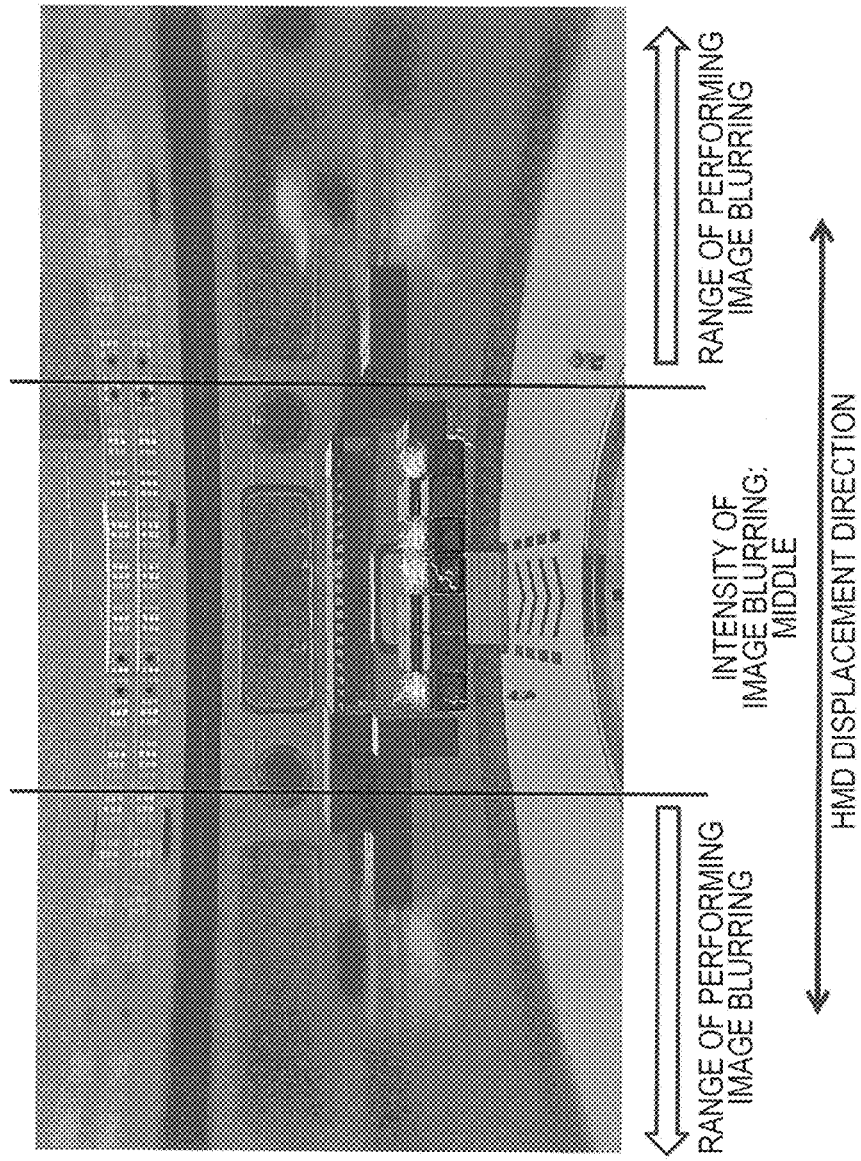

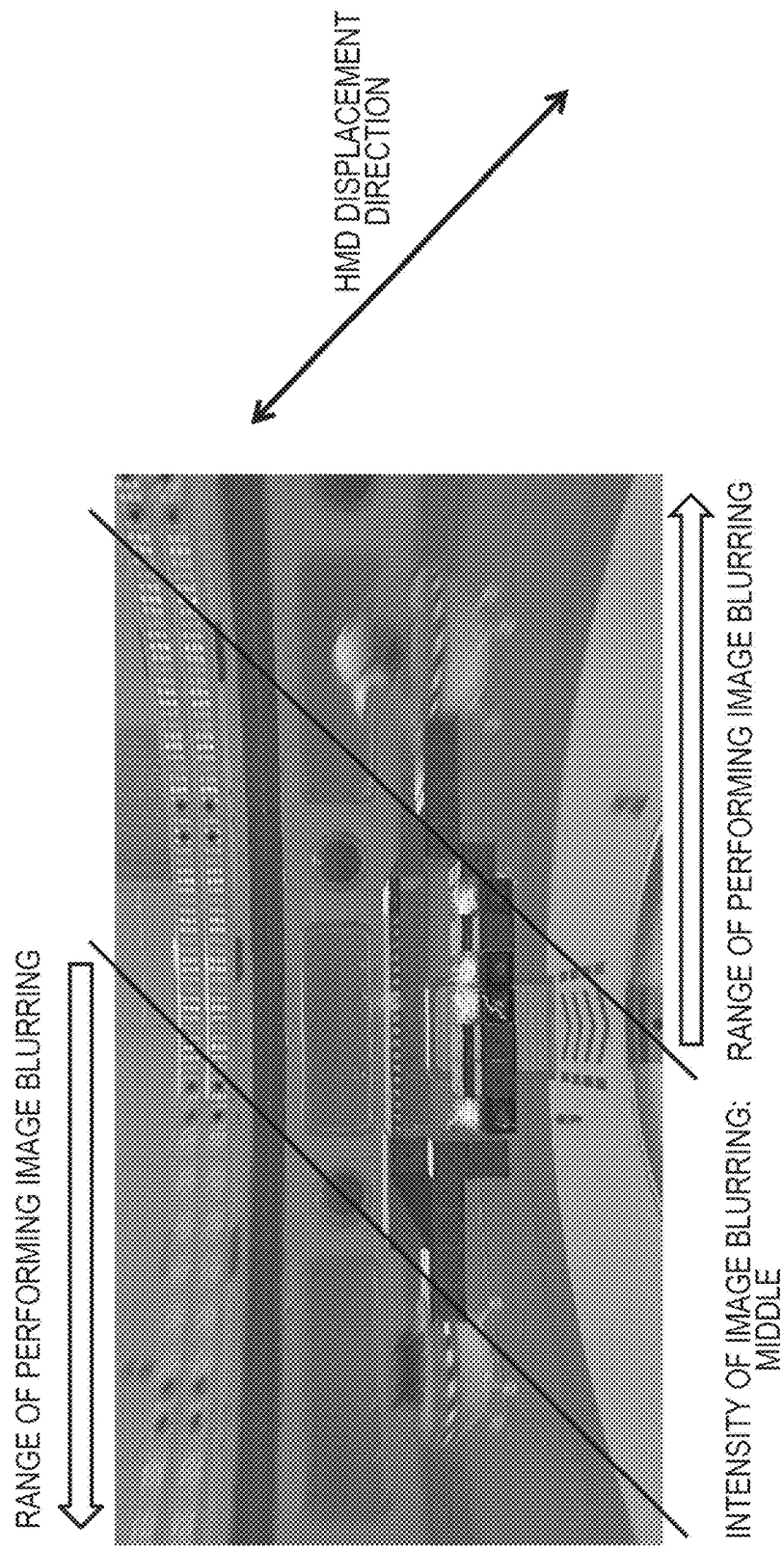

METHOD OF PROVIDING A VIRTUAL SPACE IMAGE SUBJECTED TO BLURRING PROCESSING BASED ON DETECTED DISPLACEMENT, AND SYSTEM THEREFOR

RELATED APPLICATIONS

The present application is a continuation of U.S. patent application Ser. No. 15/422,426 filed on Feb. 1, 2017, which claims priority to Japanese Patent Application No. 2016-017825 filed Feb. 2, 2016. The disclosures of all of the above-listed prior-filed applications are hereby incorporated by reference herein in their entirety.

TECHNICAL FIELD

This disclosure relates to a method of providing a virtual space image to be visually recognized by a user to a head mounted display (hereinafter referred to as "HMD"), and a system therefor.

BACKGROUND ART

In Patent Literature 1, there is described a method involving detecting an angular velocity of the movement of an image pickup apparatus and performing filter processing in which a blur amount for an outer peripheral part or a peripheral edge part with respect to a central part is set based on the angular velocity, to thereby prevent visually induced motion sickness.

PRIOR ART DOCUMENT

Patent Literature

[Patent Literature 1] Japanese Patent Application Laid-open No. 2007-116309

SUMMARY

However, the image pickup apparatus in Patent Literature 1 is placed in a real space, and does not presuppose a special audiovisual environment exhibited when, for example, a user wearing an HMD is immersing himself or herself in a virtual space. This disclosure helps to reduce visually induced motion sickness (so-called VR motion sickness) caused when virtual reality (hereinafter referred to as "VR") is provided with use of an HMD.

In the method described in Patent Literature 1, a characteristic detecting unit detects a motion vector of a portion to be detected based on an input image signal acquired from a stereoscopic camera, to thereby determine the magnitude of the movement of the image. Then, an image quality is reduced in accordance with the result of the determination, to thereby reduce a visual load on an observer.

However, Patent Literature 1 does not support a case where a user's visual field in a VR space is synchronized with the movement of the HMD, and no description of a method of reducing VR sickness that is suitable for such a case is provided.

This disclosure has been made in view of the above-mentioned, and describes a method of providing a virtual space image to be visually recognized by a user to an HMD, and a system therefor, which are devised for reducing VR sickness, and are particularly suitable for a case where a user's visual field in a VR space is synchronized with the movement of the HMD.

A basic mode of this disclosure relates to a method of providing a virtual space image to be visually recognized by a user to a head mounted display. The method includes acquiring a rotational direction and a rotational speed of the head mounted display. The method further includes setting a direction of performing image information amount reduction processing based on the rotational direction, and setting a range and an intensity of performing the image information amount reduction processing based on the rotational speed. The method further includes performing the image information amount reduction processing in a virtual space to be visually recognized by the user based on displacement of the head mounted display, to thereby generate an image having a reduced image information amount. The "image information amount reduction processing" of this disclosure means processing for reducing an image information amount in a virtual space image to be visually recognized by the user wearing the HMD. The image information amount reduction processing includes various types of image processing for reducing the image information amount, such as blurring an image, reducing contrast, and reducing chromaticity information.

According to this disclosure, the VR sickness can be reduced or eliminated under a visibility state in which the user's visual field in the VR space is synchronized with the movement of the HMD. Further, even if the resolution of the HMD is further increased in the future, the occurrence of the VR sickness due to the increased resolution can be effectively reduced.

BRIEF DESCRIPTION OF THE DRAWINGS

FIG. 5 is a flow chart of a method of at least one embodiment of this disclosure.

FIG. 6A is a schematic diagram of a mode example of an image generated by blurring an image, which is one mode of image information amount reduction processing, in a horizontal direction of a virtual reality space when an angular velocity is generated at a yaw angle due to rotation of the HMD about a Y axis.

FIG. 6C is a schematic diagram of a mode example of an image generated by blurring an image, which is one mode of the image information amount reduction processing, in an HMD displacement direction (oblique direction in FIG. 6C).

DETAILED DESCRIPTION

Figure 1:
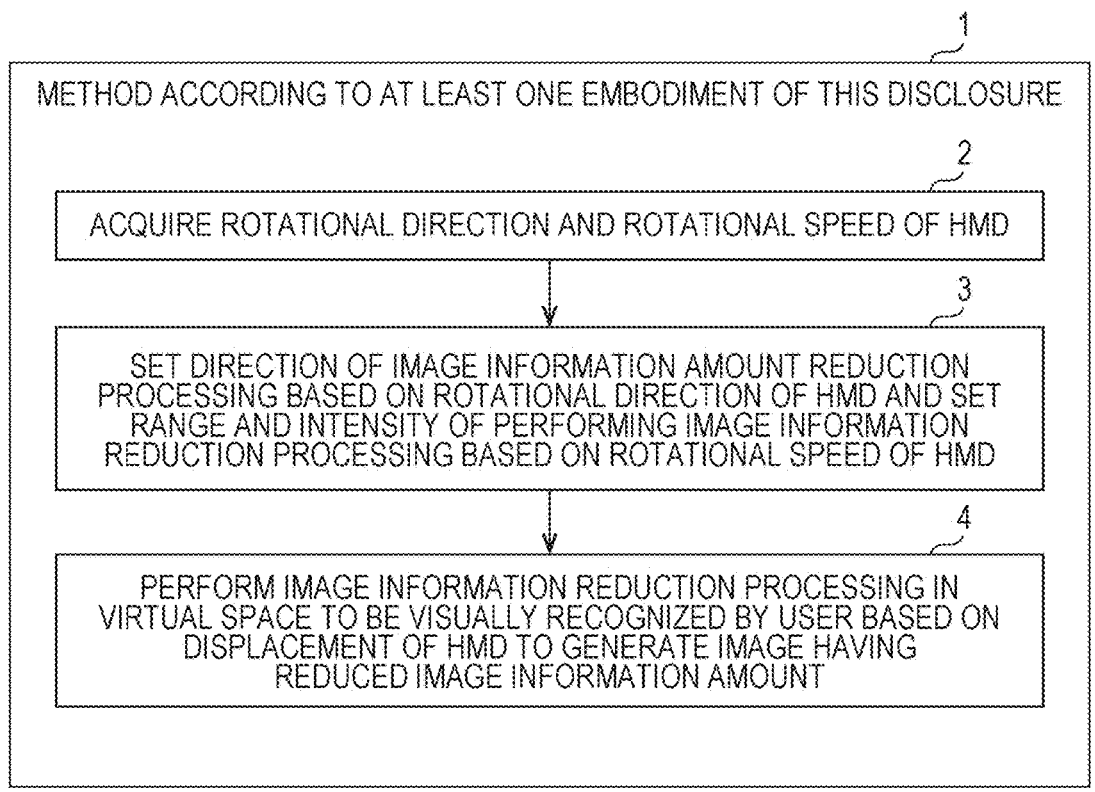
FIG. 1 is a flow chart of a method according to at least one embodiment of this disclosure.

Outlines of embodiments of this disclosure are exemplified and listed as below.

[Mode 1]

A method of providing a virtual space image to be visually recognized by a user to a head mounted display. The method includes acquiring a rotational direction and a rotational speed of the head mounted display. The method further includes setting a direction of performing image information amount reduction processing based on the rotational direction, and setting a range and an intensity of performing the image information amount reduction processing based on the rotational speed. The method further includes performing the image information amount reduction processing in a virtual space to be visually recognized by the user based on displacement of the head mounted display, to thereby generate an image having a reduced image information amount.

According to Mode 1, reduction in visibility can be reduced or prevented while the VR sickness is reduced.

[Mode 2]

A method according to Mode 1, in which the rotational direction and the rotational speed of the head mounted display are acquired by detecting an angular velocity vector in accordance with rotation of the head mounted display.

According to Mode 2, the rotational direction and the rotational speed of the head mounted display can be easily acquired.

[Mode 3]

A method according to Mode 1 or 2, in which the direction of performing the image information amount reduction processing and/or the intensity of performing the image information amount reduction processing is/are set in a stepwise manner.

According to Mode 3, the image information amount reduction processing can be easily achieved.

[Mode 4]

A method according to any one of Modes 1 to 3, in which the image information amount reduction processing is inhibited when the rotational speed is less than a predetermined value.

According to Mode 4, in particular, reduction in visibility can be reduced or prevented.

[Mode 5]

A method according to any one of Modes 1 to 4, in which the rotational direction and/or the rotational speed are/is acquired as a discrete value.

According to Mode 5, the direction and/or the degree of the image information amount reduction processing can be simply set, and the influence of minute fluctuations and the like caused during rotation can be reduced or avoided.

At least one embodiment of this disclosure relates to a system for achieving each of the above-mentioned methods using a computer.

The system is able to produce actions and effects similar to those of the method.

Now, at least one embodiment of this disclosure is described in detail with reference to the drawings. This disclosure is not to be limited to the at least one embodiment described below, and is to be interpreted based on the description of the appended claims. Further, a person skilled in the art can employ other similar embodiments, and can perform change or addition of modes as appropriate without departing from the scope of this disclosure.

This disclosure has been devised schematically based on the following new findings.

Now, there is assumed a case where a user is present in a real space and his or her head is turned in a horizontal direction. When a rotational speed is fast (high), a viewing angle is small and a visible range is narrowed to a line-of-sight direction. Further, a peripheral region to be visually recognized is blurred due to the effect of motion blur. Thus, the user can acquire information of a natural visual system based on such a visibility mode, and the amount of information to be acquired can be reduced to an extent that causes less visual load, excluding a visible region at a central part.

Meanwhile, also in a virtual reality space to be visually recognized by the user wearing an HMD, when the following visibility mode can be achieved, the user is expected to acquire information of a relatively natural visual system similarly to the above-mentioned case in the real space. Specifically, when an HMD displacement speed is high, the visible range is narrowed to the line-of-sight direction, and the direction of performing the image information amount reduction processing is determined based on the direction of displacement of the head mounted display. Then, the information amount is reduced in the virtual space image to be visually recognized by the user, excluding the visible region at the central part. In this manner, the information amount of a region excluding the visible region at the central part can be reduced to an extent that causes less visual load. Thus, the VR sickness, which is partially caused by the visual load, can be expected to be reduced.

FIG. 1 is a flow chart of a method according to at least one embodiment of this disclosure based on the new findings described above. The method includes Step 2 of acquiring a rotational direction and a rotational speed of an HMD. The method further includes Step 3 of setting a direction of performing image information amount reduction processing based on the rotational direction, and setting a range and an intensity of performing the image information amount reduction processing based on the rotational speed. The method further includes Step 4 of performing the image information amount reduction processing in a virtual space to be visually recognized by the user based on displacement of the HMD, to thereby generate an image having a reduced image information amount. Details of the steps are described later (for example, see the description referring to FIG. 5).

Figure 2:
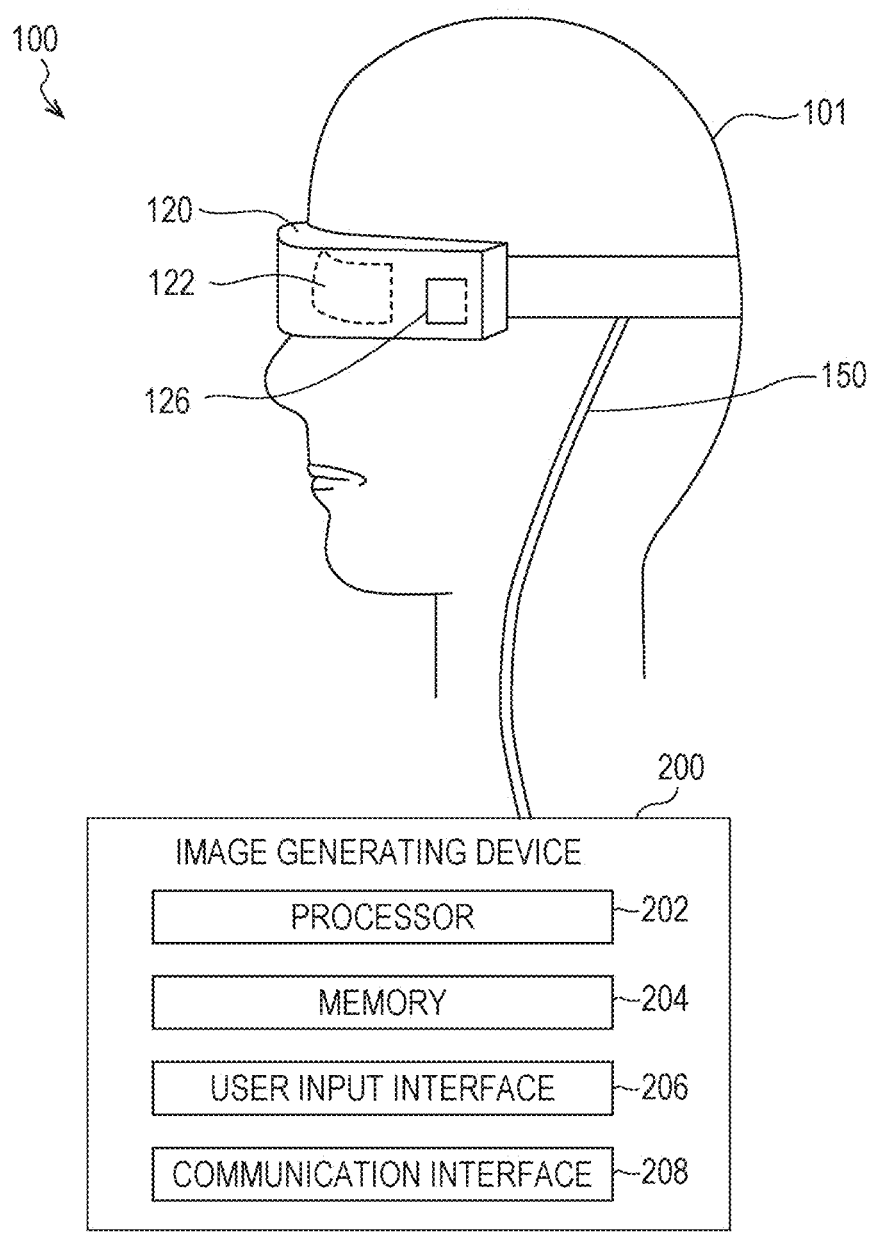
FIG. 2 is a conceptual diagram of a hardware configuration of an entire system including at least one embodiment of this disclosure.

FIG. 2 is a conceptual diagram of a hardware configuration of a system according to at least one embodiment of this disclosure. A system 100 includes, as the hardware configuration, an HMD 120 and an image generating device 200. The HMD 120 and the image generating device 200 are electrically connected to each other by, for example, a cable 150 so that mutual communication is enabled therebetween. Wireless communication may be used instead of the cable 150.

The HMD 120 is a display device to be used by being worn on a head of a user 101. The HMD 120 includes a display 122 and a sensor 126. The HMD 120 may further include a speaker and/or headphones (not shown).

The display 122 is configured to present an image in a field of view of the user 101 wearing the HMD 120. For example, the display 122 may be configured as a non-transmissive (or partially transmissive) display. In this case, the sight of the outside world of the HMD 120 is at least partially blocked from the field of view of the user 101, and the user 101 can see the image displayed on the display 122. On the display 122, for example, an image generated with use of computer graphics is displayed. As an example of the image generated with use of computer graphics, there is given a virtual reality space image obtained by forming an image of a space of virtual reality, for example, a world created in a computer game.

The sensor 126 is a sensor configured to detect the direction of movement of the head of the user 101 wearing the HMD 120. Examples of the sensor 126 include a magnetic sensor, an angular velocity sensor, an acceleration sensor, or a combination thereof. When the sensor 126 is a magnetic sensor, an angular velocity sensor, or an acceleration sensor, the sensor 126 is built into the HMD 120, and is configured to output a value (magnetic, angular velocity, or acceleration value) based on the direction or the movement of the HMD 120. By processing the value output from the sensor 126 by an appropriate method, the direction of movement of the head of the user 101 wearing the HMD 120 is calculated. The direction of the head of the user 101 can be used to change a display image of the display 122 so as to follow the movement of the head of the user 101 when the head is moved. For example, when the user 101 turns his or her head to the right (or left, upper, or lower) side, the display 122 displays a virtual view that is present in the right (or left, upper, or lower) direction of the user in the virtual reality space.

As the sensor 126, a sensor provided outside of the HMD 120 may be employed. For example, the sensor 126 may be an infrared sensor that is installed separately from the HMD 120 at a fixed position in the room. The infrared sensor may be used to detect an infrared reflective marker formed on the surface of the HMD 120, to thereby specify the direction of the head of the user 101 wearing the HMD 120.

The image generating device 200 is a system for generating an image to be displayed on the HMD 120. The image generating device 200 includes at least, as the hardware configuration, a processor 202, a memory 204, a user input interface 206, and a communication interface 208. The image generating device 200 may be a dedicated device, but, for example, the image generating device 200 may be achieved as a personal computer, a game console, a smart phone, a personal digital assistant (PDA), or a tablet terminal.

The memory 204 has stored therein at least an operating system and an image generating program. The operating system is a computer program containing instructions for controlling the entire operation of the image generating device 200. The memory 204 can further temporarily or permanently store data generated by the operation of the image generating device 200. Specific examples of the memory 204 include a read only memory (ROM), a random access memory (RAM), a hard disk, a flash memory, and an optical disc.

The processor 202 is configured to read out instructions stored in the memory 204, to thereby execute processing in accordance with the instructions. The processor 202 executes the instructions stored in the memory 204, to thereby generate an image to be displayed on a screen. The processor 202 includes a central processing unit (CPU) and a graphics processing unit (GPU).

The user input interface 206 is configured to receive input for operating the image generating device 200 from the user of the system 100. Specific examples of the user input interface 206 include a game controller, a touch pad, a mouse, and a keyboard.

The communication interface 208 is a network interface for communicating to/from another device via a network.

The image generating system may be constructed as a set of instructions independent from an SNS platform, or may be constructed as a set of instructions to be provided on the SNS platform. In the case of the set of instructions to be provided on the SNS platform, the set of instruction is implemented on a server, and the server executes calculation processing or data processing for image generation in accordance with input operation of each user. Therefore, in such a case, storing the image generating instructions in the memory 204 is avoided in at least one embodiment.

Next, a basic operation of the image generating device 200 is described. In the following description, the virtual space means a virtual reality (VR) space.

Figure 3:
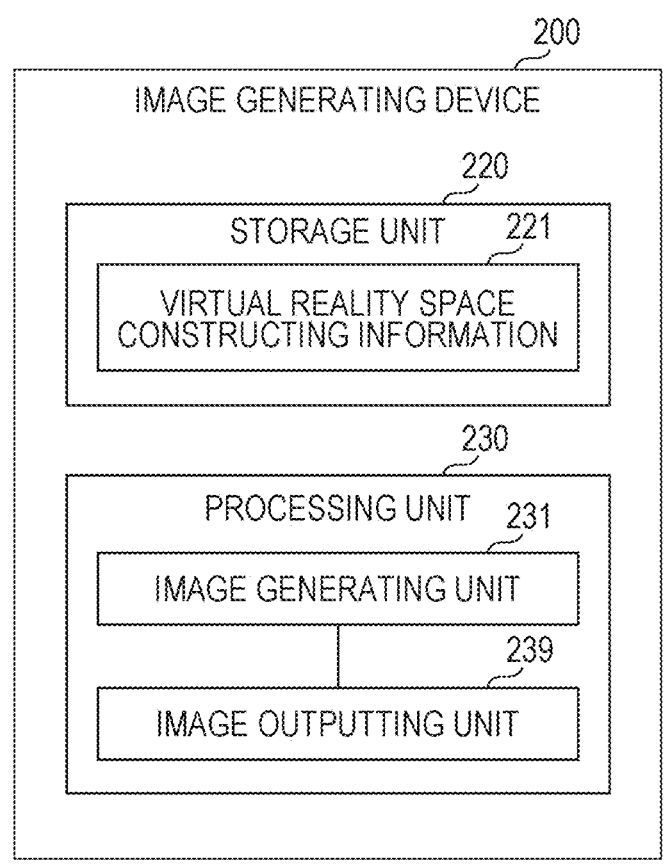
FIG. 3 is a block diagram of an image generating device according to at least one embodiment of this disclosure.

FIG. 3 is a block diagram of an image generating device 200 according to at least one embodiment, which represents functions for the image generation processing to be achieved by the processor 202 illustrated in FIG. 2 reading out and executing the image generating instructions stored in the memory 204.

An image generating unit 231 is configured to generate an image to be displayed on the HMD 120. For example, the image generating unit 231 acquires predetermined data from a storage unit 220, to thereby generate an image by computer graphics processing based on the acquired data. As at least one example, the image generating unit 231 may generate such a virtual reality space image that the second user 101 wearing the HMD 120 can recognize a virtual reality space of a computer game. The virtual reality space image represents an image that the user can see in the virtual reality space. For example, the virtual reality space image to be generated by the image generating unit 231 includes various objects such as characters that appear in a computer game, landscape including buildings and trees, interior decorations including furniture and walls in a room, items on the ground, a part (hand or foot) of a body of an avatar (user himself or herself) to be operated by the user, or an object (gun or sword) held by the avatar. Data necessary for generating the virtual reality space image, such as arrangement positions, shapes, and colors of the above-mentioned objects constructing the virtual reality space, is stored in the storage unit 220 as virtual reality space constructing information 221. The image generating unit 231 is configured to generate such a virtual reality space image of a computer game based on the virtual reality space constructing information 221 acquired from the storage unit 220.

Figure 4A:
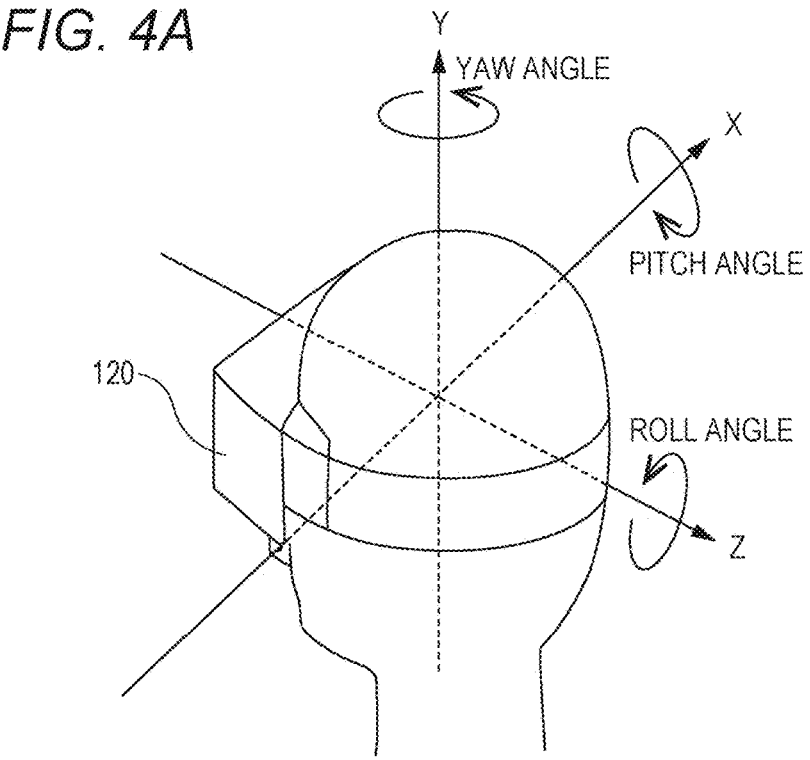
FIG. 4A is a schematic diagram of movement of a head of a user.

Further, the image generating unit 231 is configured to change an image based on the output value from the sensor 126. For example, the image to be generated by the image generating unit 231 may be an image representing a state in which the field of view of the user in the virtual reality space transitions so as to follow the movement of the head of the user 101, which is represented by the output value from the sensor 126. As an example, FIG. 4A is a schematic illustration of the movement of the head of the user. As illustrated in FIG. 4A, an axis connecting between the center of the head of the user 101 and the center of the HMD 120 (center of the screen of the display 122) is set as a Z axis, an axis connecting between the center of the head of the user 101 and the top of the head is set as a Y axis, and an axis passing through the center of the head of the user 101 and being orthogonal to the Y axis and the Z axis is set as an X axis. When the sensor 126 is, for example, an angular velocity sensor, the sensor 126 outputs values of respective angular velocities of a pitch angle about the X axis, a yaw angle about the Y axis, and a roll angle about the Z axis. The image generating unit 231 changes the virtual reality space image based on the output values of those angular velocities, that is, the direction of the head of the user 101. For example, when the user 101 turns his or her head to the right, the yaw angle about the Y axis is changed. The image generating unit 231 changes the virtual reality space image so that the view in the right direction of the user in the virtual reality space is displayed in accordance with the change in angular velocity value about the Y axis. Similarly, when the user 101 inclines his or her head to the right, the roll angle about the Z axis is changed. The image generating unit 231 changes the virtual reality space image so that the field of view of the user in the virtual reality space is inclined to the right in accordance with the change in angular velocity value about the Z axis.

Further, the image generating unit 231 is configured to change the image based on the position of the user. For example, when the user walks around in the virtual reality space, the image to be generated by the image generating unit 231 may be an image representing a view to be seen by the user from a position at which the user is currently standing in the virtual reality space. As an example, information of the temporal position of the user in the virtual reality space is stored in the storage unit 220. The image generating unit 231 acquires the latest information of the position of the user in the virtual reality space from the storage unit 220. In addition, from the user input interface 206, for example, a game controller, instructions of a moving direction and a moving speed of the user are input as operation input for the user to walk around in the virtual reality space. The image generating unit 231 calculates the current position of the user in the virtual reality space based on the latest information of the position of the user, which is acquired from the storage unit 220, and on the information of the moving direction and the moving speed of the user, which is input from the user input interface 206. The image generating unit 231 changes the virtual reality space image based on the calculated current position of the user so that the field of view of the user changes in accordance with the user walking in the virtual reality space.

Figure 4B:
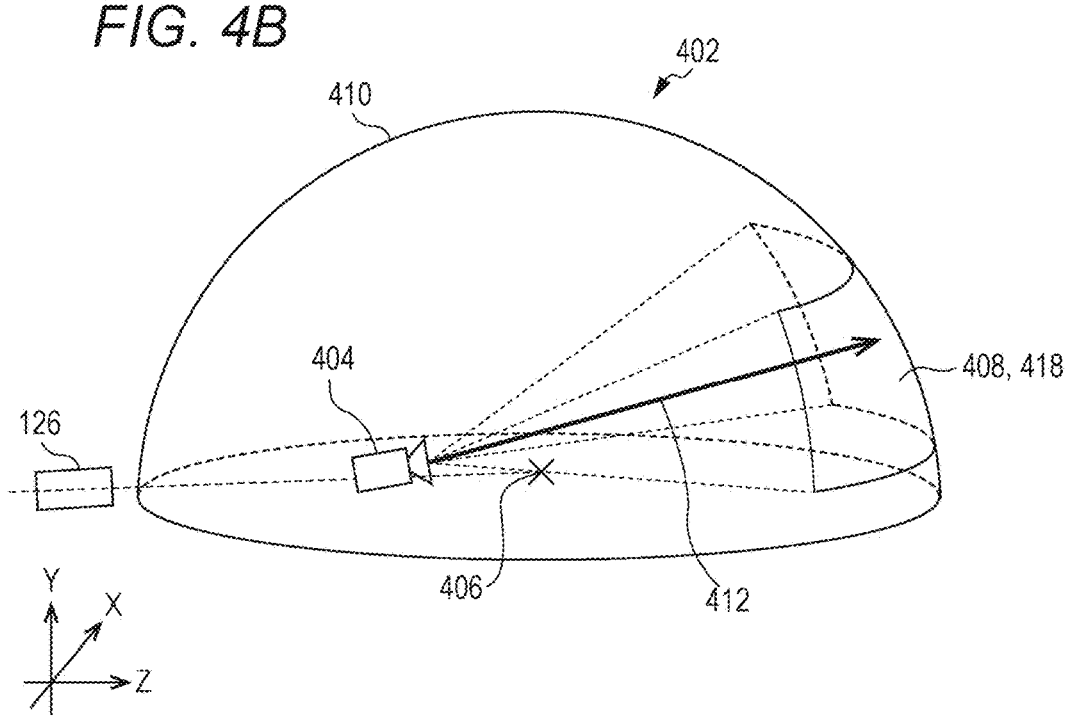
FIG. 4B is a schematic diagram of a relationship between position tracking performed by a sensor and a virtual camera arranged in a virtual space.

FIG. 4B is a schematic diagram of a relationship between position tracking performed by the sensor 126 and a virtual camera 404 arranged in a virtual space 402. The position tracking means a function of detecting information relating to the position and the inclination of the HMD 120 with use of the sensor 126.

In FIG. 4B, the virtual camera 404 is arranged at a predetermined position in the virtual space 402, and the sensor 126 is virtually arranged outside of the virtual space 402 (in the real space). A field-of-view region 408 is a part (field-of-view image 418) forming a user's field of view in a virtual space image 410. The field-of-view region 408 is determined based on a reference line of sight 412, and the reference line of sight 412 is determined based on the position and the inclination of the virtual camera 404. In this manner, the virtual camera 404 arranged at a predetermined position in the VR space being a three-dimensional virtual space is controlled in accordance with the movement of the head of the user being a wearer of the HMD 120, and the image (field-of-view image 418) in the field-of-view region 408 acquired by the virtual camera 404 is visually recognized by the user. The field-of-view region 408 to be visually recognized by the user is determined based on the reference line of sight 412 of the virtual camera 404, and the movement of the HMD 120 is associated with the movement of the virtual camera 404 so that the reference line of sight 412 matches with the Z-axis direction (see FIG. 4A) of the HMD 120.

As described above, the image generating unit 231 generates the virtual reality space image in accordance with the position and the head direction of the user in the virtual reality space. The generated virtual reality space image is output to the HMD 120 via the image outputting unit 239, and is displayed on the display 122. With this, the user can see the virtual view present in the direction in which the head is directed from the position at which the user is currently standing in the virtual reality space.

Figure 6B:
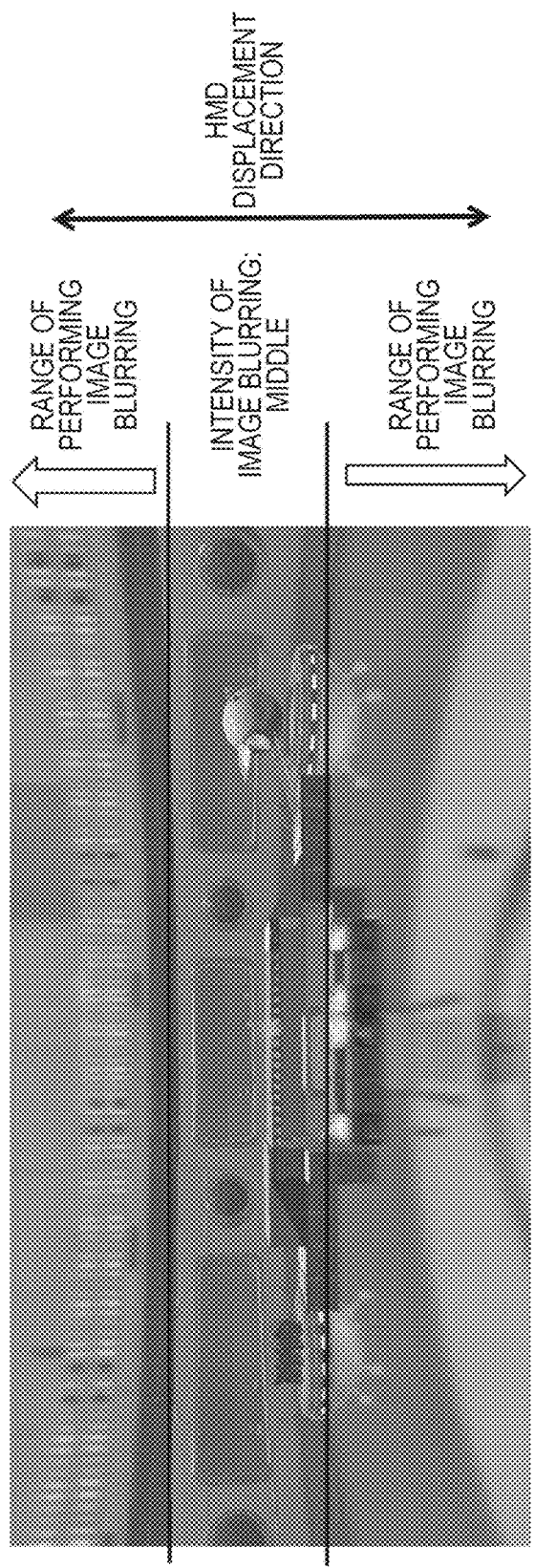
FIG. 6B is a schematic diagram of a mode example of an image generated by blurring an image, which is one mode of the image information amount reduction processing, in a vertical direction of the virtual reality space when an angular velocity is generated at a pitch angle due to rotation of the HMD about an X axis.

Next, an outline of one example of processing of at least one embodiment of this disclosure is described based on examples illustrated in FIG. 5, FIG. 6A, and FIG. 6B. FIG. 5 is a flow chart of a method of processing operations of at least one embodiment of this disclosure. Further, FIG. 6A is a schematic diagram of a mode example of a case of blurring an image, which is one mode of the image information amount reduction processing, in the horizontal direction of the virtual reality space, FIG. 6B is a schematic diagram of a mode example of a case of blurring an image, which is one mode of the image information amount reduction processing, in the vertical direction of the virtual reality space, and FIG. 6C is a schematic diagram of a mode example of an image generated by blurring an image, which is one mode of the image information amount reduction processing, in an HMD displacement direction (oblique direction in FIG. 6C).

First, respective angular velocities $\omega X$, $\omega Y$, and $\omega Z$ of the pitch angle about the X axis, the yaw angle about the Y axis, and the roll angle about the Z axis, which are output from the angular velocity sensor 126 (see FIG. 2) of the HMD, are detected (S501).

In at least one embodiment, the detected angular velocities $\omega X$, $\omega Y$, and $\omega Z$ are subjected to discretization processing (S502). The discretization processing means replacing the detected angular velocities $\omega X$, $\omega Y$, and $\omega Z$ being data having continuous values by discontinuous numerical values (discrete values). Such discretization processing is a method effective for avoiding influence of fluctuations when there are minute fluctuations in the angular velocities $\omega X$, $\omega Y$, and $\omega Z$. The discrete values obtained through the discretization do not necessarily have equal intervals. For example, discretization of regarding a detected value that is less than a predetermined value as "0" or discretization of segmenting a predetermined range may be employed as appropriate.

A three-dimensional angular velocity vector $\Omega$ having the respective angular velocities $\omega X$, $\omega Y$, and $\omega Z$ as components is determined based on the angular velocities $\omega X$, $\omega Y$, and $\omega Z$. Then, a magnitude, i.e., an absolute value, $|\Omega|$ and a direction $\Omega/|\Omega|$ of the angular velocity vector $\Omega$ are acquired (S503).

In at least one embodiment, the angular velocity vector $\Omega$ is subjected to discretization processing with respect to the magnitude $|\Omega|$ and direction $\Omega/|\Omega|$ (S504). The discretization processing is, as described above, a method effective for avoiding influence of fluctuations when there are minute fluctuations in the magnitude $|\Omega|$ and the direction $\Omega/|\Omega|$ of the angular velocity vector $\Omega$. As described above, in at least one embodiment, the discrete values obtained through the discretization do not have equal intervals.

Next, whether or not the magnitude $|\Omega|$ of the angular velocity vector $\Omega$ is less than a predetermined value is determined (S505). When the result of the determination is positive, the processing for blurring an image is inhibited. Further, when the result of the determination is negative, the processing proceeds to the following step.

Next, a direction of performing the processing of blurring an image is set based on the direction $\Omega/|\Omega|$ of the angular velocity vector $\Omega$ (direction of displacement of the HMD), and an intensity of the image blurring and a range of performing the processing of blurring an image are set based on the magnitude $|\Omega|$ of the angular velocity vector $\Omega$ (S506). The intensity of blurring means the degree of the blurring of the image, that is, the degree of reducing the image information amount.

Figure 7:
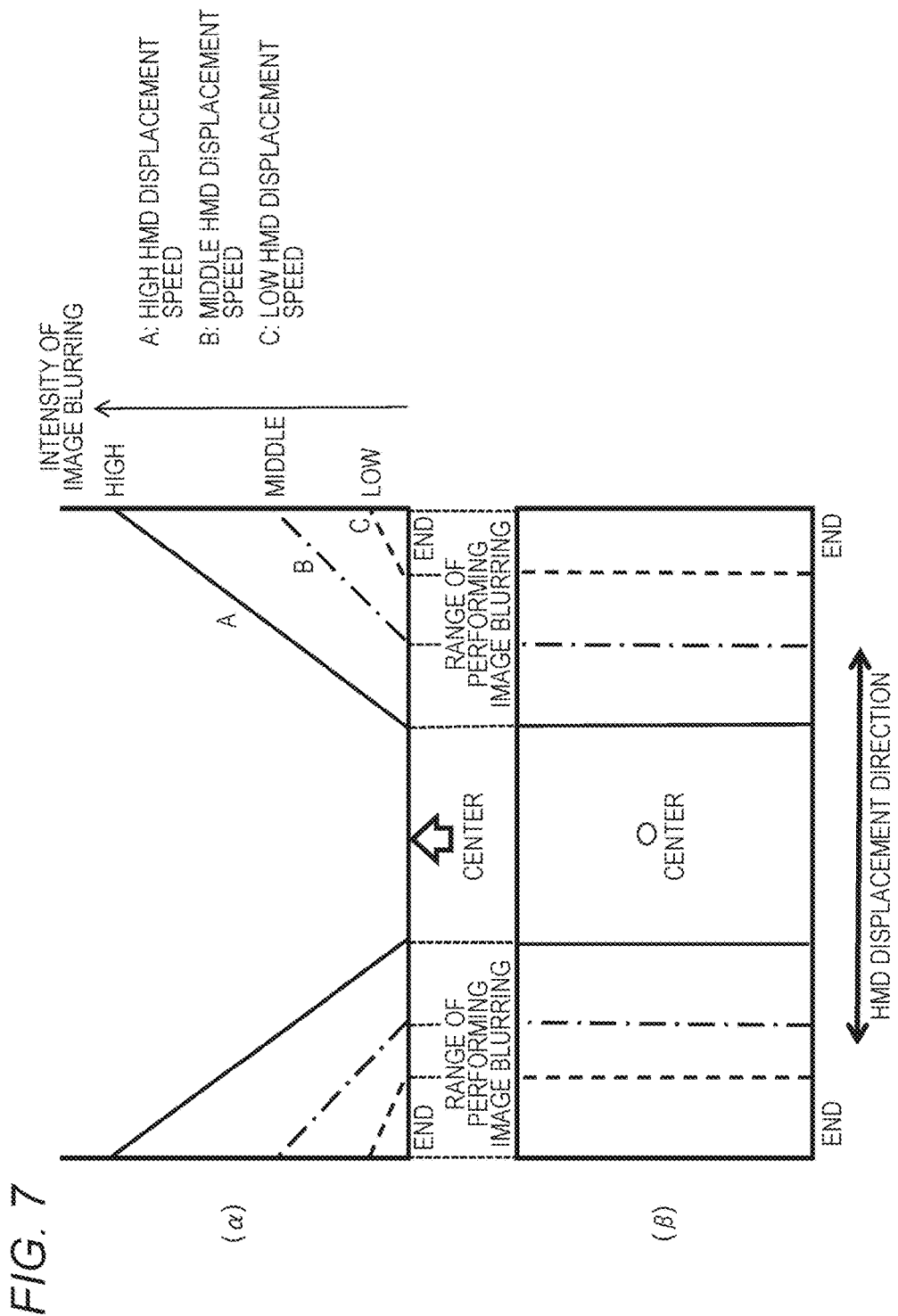
FIG. 7 is a schematic diagram of an example of an intensity of the image blurring, which is one mode of the image information amount reduction processing, and a range of performing the processing of blurring an image.

The above-mentioned setting of the intensity of the image blurring and the range of performing the processing of blurring an image is described with reference to FIG. 7. FIG. 7 is a schematic diagram of an example of the intensity of the image blurring and the range of performing the processing of blurring an image. FIG. 7 includes an example of a method involving increasing a range of a peripheral region to be subjected to the processing of blurring an image and increasing the intensity of the image blurring in the peripheral region as the HMD displacement speed is increased, to thereby achieve a natural visibility mode.

FIG. 7 is a diagram of a case where the HMD displacement direction is a horizontal direction of FIG. 7, in which part (β) represents a range of the peripheral region to be subjected to the processing of blurring an image in the visible range. Further, in part (α), on the left and right sides of the center of the visible range, the intensity of the image blurring is represented by a solid line A, a dashed-dotted line B, and a broken line C. In this case, the solid line A, the dashed-dotted line B, and the broken line C correspond to cases of a high HMD displacement speed, a middle HMD displacement speed, and a low HMD displacement speed, respectively, and schematically indicate the intensity of the image blurring in the peripheral region in accordance with the magnitude of the HMD displacement speed. As is apparent from FIG. 7, as the HMD displacement speed is increased, the range of the peripheral region to be subjected to the processing of blurring an image is increased, and the intensity of the image blurring in the peripheral region is also increased. The reason why the intensity of the image blurring is increased toward the end is for changing an image from a state in which the processing of blurring an image is not performed so as to generally subject the image to the processing of blurring an image, to thereby provide a natural visibility mode to the user wearing the HMD. Further, in order to obtain an effect of image blurring in accordance with the HMD displacement speed, the solid line A, the dashed-dotted line B, and the broken line C have different slopes. In FIG. 7, the solid line A, the dashed-dotted line B, and the broken line C are indicated in a straight-line mode, but the lines are not necessarily limited to straight lines. A curved-line mode or a mode of change in a stepwise manner may be employed in at least one embodiment.

Then, the processing of blurring an image is performed based on the displacement of the HMD, and thus an image having a reduced image information amount is generated in the virtual space to be visually recognized by the user (S507).

Specific examples of images obtained by the processing of Step S507 are described in detail with reference to FIG. 6A, FIG. 6B, and FIG. 6C. FIG. 6A is a schematic diagram of a mode example of an image generated by blurring an image in the horizontal direction of the virtual reality space when an angular velocity is generated at the yaw angle due to rotation of the HMD about the Y axis. Further, FIG. 6B is a schematic diagram of a mode example of an image generated by blurring an image in the vertical direction of the virtual reality space when an angular velocity is generated at the pitch angle due to rotation of the HMD about the X axis. Further, FIG. 6C is a schematic diagram of a mode example of an image generated by blurring an image in the HMD displacement direction (oblique direction in FIG. 6C).

First, description is made of the mode example in FIG. 6A of the image generated by blurring an image in the horizontal direction of the virtual reality space when an angular velocity is generated at the yaw angle due to rotation of the HMD about the Y axis. In the mode example of FIG. 6A, the angular velocity is generated at the yaw angle due to the rotation of the HMD about the Y axis, and hence the degree of the image blurring in the horizontal direction and the range of performing the processing of blurring an image are set based on the magnitude of the angular velocity. Specifically, there is assumed a case where the magnitude of the angular velocity is at a stage of "middle" among the three stages of high, middle, and low, and the width of the peripheral region to be subjected to the processing of blurring an image is set to the middle stage among the three stages of large, middle, and small based on the middle-stage magnitude of the angular velocity. In addition, the intensity (degree) of the image blurring in the peripheral region is set to the middle stage among the three stages of high, middle, and low. With such a configuration, as described above, the user can acquire information of a relatively natural visual system, and the acquired information amount can be reduced to an extent that causes less visual load. Therefore, the VR sickness, which is partially caused by the visual load, can be reduced.

In the mode example of FIG. 6A, as the magnitude of the angular velocity is increased or decreased, the width of the peripheral region to be subjected to the processing of blurring an image and the degree of the image blurring can also be increased or decreased.

Next, description is made of the mode example in FIG. 6B of the image generated by blurring an image in the vertical direction of the virtual reality space. In the mode example of FIG. 6B, the angular velocity is generated at the pitch angle due to the rotation of the HMD about the X axis, and hence the degree of the image blurring in the vertical direction and the range of performing the processing of blurring an image are set based on the magnitude of the angular velocity. Specifically, there is assumed a case where the magnitude of the angular velocity is at a stage of "middle" among the three stages of high, middle, and low, and the width of the peripheral region to be subjected to the processing of blurring an image is set to the middle stage among the three stages of large, middle, and small based on the middle-stage magnitude of the angular velocity. In addition, the intensity (degree) of the image blurring in the peripheral region is set to the middle stage among the three stages of high, middle, and low. With such a configuration, as described above, the user can acquire information of a relatively natural visual system, and the acquired information amount can be reduced to an extent that causes less visual load. Therefore, the VR sickness, which is partially caused by the visual load, can be reduced.

Also in the mode example of FIG. 6B, as the magnitude of the angular velocity is increased or decreased, the width of the peripheral region to be subjected to the processing of blurring an image and the degree of the image blurring can also be increased or decreased.

Next, description is made of the mode example in FIG. 6C of the image generated by blurring an image in the HMD displacement direction. In general, the displacement of the HMD causes rotation about the X axis, the Y axis, and the Z axis of the HMD, and hence the angular velocity is generated at each of the pitch angle about the X axis, the yaw angle about the Y axis, and the roll angle about the Z axis due to the displacement of the HMD. In this case, the angular velocity vector having the pitch angle about the X axis, the yaw angle about the Y axis, and the roll angle about the Z axis as components is obtained. Then, the direction of performing the processing of blurring an image can be determined based on the direction of the angular velocity vector, and the width of the peripheral region to be subjected to the processing of blurring an image and the intensity (degree) of the image blurring can be determined based on the magnitude of the angular velocity vector.

In FIG. 6C, the HMD displacement direction (direction of the angular velocity vector) has horizontal and vertical components on the screen, and hence the direction of performing the processing of blurring an image is an oblique direction on the screen. In FIG. 6C, there is assumed a case where the magnitude of the angular velocity vector is at a stage of "middle" among the three stages of high, middle, and low, and the width of the peripheral region (region in the oblique direction) to be subjected to the processing of blurring an image is set to the middle stage among the three stages of large, middle, and small based on the middle-stage magnitude of the angular velocity. In addition, the intensity (degree) of the image blurring in the peripheral region is set to the middle stage among the three stages of high, middle, and low. With such a configuration, as described above, the user can acquire information of a relatively natural visual system, and the acquired information amount can be reduced to an extent that causes less visual load. Therefore, the VR sickness, which is partially caused by the visual load, can be reduced.

Also in the mode example of FIG. 6C, as the magnitude of the angular velocity vector is increased or decreased, the width of the peripheral region to be subjected to the processing of blurring an image and the intensity (degree) of the image blurring can also be increased or decreased. Further, the direction of performing the processing of blurring an image can be determined based on the HMD displacement direction, and an image having a reduced information amount can be generated in the virtual space image to be visually recognized by the user.

While the description has been made above on at least one embodiment of this disclosure, this disclosure is not limited thereto, and various modifications can be made thereto without departing from the scope of this disclosure.

What is claimed is:

1. A method comprising:
generating a virtual space image for displaying on a head mounted display (HMD); acquiring a rotational direction and a rotational speed of the HMD; and
subjecting the virtual space image to blurring processing based on the rotational direction and the rotational speed, the blurring processing being performed on an end region of the virtual space image on at least one side of the virtual space image in a direction corresponding to the rotational direction, a size of the end region is based on the rotational speed, and an intensity of blurring of the end region is based on the rotational speed.

2. The method according to claim 1, wherein the rotational direction and the rotational speed of the HMD are acquired by detecting an angular velocity vector in accordance with rotation of the HMD.

3. The method according to claim 1, wherein the direction of the blurring processing or the intensity of the blurring processing is set in a stepwise manner.

4. The method according to claim 1, wherein the blurring processing is inhibited when the rotational speed is less than a predetermined value.

5. The method according to claim 1, wherein the rotational direction or the rotational speed is acquired as a discrete value.

6. A system comprising:
a processor;
a non-transitory computer readable medium connected to the processor, wherein the non-transitory computer readable medium is configured to store instructions for execution by the processor to:
generate a virtual space image for displaying on a head mounted display (HMD);
acquire a rotational direction and a rotational speed of the HMD; and
subject the virtual space image to blurring processing based on the rotational direction and the rotational speed, the blurring processing being performed on an end region of the virtual space image on at least one side of the virtual space image in a direction corresponding to the rotational direction, a size of the end region is based on the rotational speed, and an intensity of blurring of the end region is based on the rotational speed.

* * * * *